United States Patent Office 2,725,301

Patented Nov. 29, 1955

2,725,301

BINDERS AND METHOD IN THE PRODUCTION OF SAME

Erwin Mayer and Einar A. F. Bolin, Karlstad, Sweden, assignors to Uddeholms Aktiebolag, Uddeholm, Sweden, a Swedish joint-stock company No Drawing. Application September 7, 1951, Serial No. 245,654

10 Claims. (Cl. 106—193)

It is known in the art to mix hydrophilic organic substances with various inorganic compounds for attaining certain properties or for making the products cheaper. In spite of the fact that various methods have been suggested substantially consisting in particular modes of mixing in order to obtain an as homogeneous product as possible, it has been found that none of these methods is satisfactory in mixing the hydrophilic cellulose ether carboxylic acids or their derivatives with inorganic compounds of different kinds. Presumably this is due to the property of all these cellulose derivatives to easily form jelly products, whereby a mixing product in water solution, which obtains a homogeneous appearance by intensive working, becomes opaque or coagulates completely after storing for a shorter or longer period of time. Thereby, all these products become more or less unutilizable for certain purposes, particularly as binders, since it is very important that the binding power shall not be reduced by too early a gel formation.

Furthermore, it is a known fact that the preparation of colloidal ether carboxylic acids or their salts of multivalent metals is difficult since only by maintaining definite conditions is it possible to obtain colloidal products. Moreover, these products possess properties which are disadvantageous for further commercial use either because they are not stable or because they do not have a sufficiently spreadable consistency.

The present invention is based on the discovery that homogeneous, stable and at the same time spreadable products can be obtained by using inorganic compounds that form in water difficultly soluble or insoluble compounds with one another. This could not at all be expected. On the contrary, it could have been expected that the compounds insoluble in water, as well as the inorganic components dissolved in water, would enhance the tendency of instability and inhomogeneity. Due to the fact that this is not the case the manufacture of the new product is very simple and at the same time cheap because no time wasting and expensive operations, such as filtering, dialysis or the like are necessary. Thus, it is possible directly to use the products obtained by etherifying carbohydrate material by means of halogen fatty acids. If aluminum sulphate is added to a solution of the sodium salt of carboxy-methyl-cellulose in such an amount that the solution becomes clearly acid, an unstable transparent product is obtained which will soon form a gel and can therefore not be employed as a binder. However, if, in addition, slaked lime is incorporated in this mixture, a precipitate is formed after a few hours which is homogeneously dispersed in the solution. The mixture loses its jelly consistency and forms a product that can be spread by a painter's brush and after drying becomes insoluble in water. Through the chemical reaction between aluminium sulphate and lime, gypsum is formed but the latter is not by itself the reason for the good properties of the new product. This will be evident from the fact that if gypsum is introduced as such into a solution of the sodium salt of carboxy-methyl-cellulose in the same amount as will be formed according to the present method, a homogeneous product will not be obtained and the residue is not waterproof after drying. Furthermore, it has been found that when the correct working conditions according to the present invention are maintained it is possible to obtain weakly alkaline products which, notwithstanding their alkaline reaction, yield binders which are waterproof after drying. This is of great importance for the gluing of wood since it has been found that acid reacting products of ether carboxylic acids have not as good binding properties as alkaline products.

Alternatively to first treating carboxy-methyl-cellulose or derivatives thereof with multivalent metal salts, such as aluminium or iron or copper sulphate etc., and then treating with lime or chalk or some metal hydroxide insoluble in water, it is possible to treat the cellulose compound with the metal hydroxide and then with the metal sulphate or with these compounds in combination with each other. If, for instance, metal hydroxides and metal sulphates are allowed to interact definite conditions have to be maintained in order to obtain a good result. In any case it is much better if the reaction proceeds in the presence of the cellulose compound and even so small an amount as 2 per cent is sufficient for considerably improving the inorganic product. As the reaction of the components which react with each other in the binder is a time-reaction, a more rapid and better process may be obtained if the reaction is carried out under stirring and particularly by employing higher temperatures. Furthermore, such substances may be added that facilitate the reaction, for instance, when using a multivalent metal sulphate, a small amount of sodium sulphate or a protecting matter, such as casein or the like may be added. In the latter case the amount of the protection matter must not be so great as to reduce the resistance of the binder to water after drying. If hydroxides of multivalent metals and ether carboxylic acids are employed a utilizable binder is usually not at all obtained and in any case the reaction time is very long. By adequate measures, for instance by heating or the addition of reaction promoting means, it is possible to manufacture binders particularly useful with regard to spreadability which is of decided importance in machine binding. By the use of different metal compounds or of different acids or both different combinations can be obtained making possible the manufacture of different products usable for special purposes. It is peculiar and difficultly comprehensible that in using certain organic acids, for instance oxalic acid, for the manufacture of binders according to the present invention a water proof product is not obtained in spite of the formation of the water insoluble calcium oxalate, but if in addition merely a few per cent of sulphuric acid is added this is sufficient for obtaining a water proof binder although gypsum is much easier soluble in water than calcium oxalate. The exact amounts of the constituents of the binder are dependent on the properties of the inorganic matters and may therefore be different. According to the intended use the addition of the components which react with one another can be so arranged that the end product has a pasty consistency of high binding power. The manufacture of a binder according to the invention may be illustrated by the following examples.

1. Hydrophilic raw products obtained by etherifying cellulosic material by means of mono-chloro-propionic acid are mixed with such a great amount of aluminium sulphate as to produce a product insoluble in water which is not useful as binder. If, however, slaked lime is added in such proportions that the product resulting from a treatment during a relatively long period of time has a neutral or slightly alkaline reaction a stable product is obtained at storing. This product can immediately be used as a binder.

2. The sodium salt of carboxy-methyl-cellulose is dissolved in water and a solution of copper sulphate in ammonia is added thereto without precipitation taking place. The mixture is then heated until the ammonia has been removed, whereby the original blue colour is changed to brownish black colour. If the obtained product is used for coating a wood or the like a water proof layer is obtained after drying, the layer simultaneously protecting the wood against deterioration.

3. A proportion of chalk is added to cellulose glycolic acid obtained by the decomposition of the sodium salt of carboxy-methyl-cellulose with sulphuric acid and the mixture is heated until a viscous spreadable mass is obtained which is very suitable for gluing wood, with or without the addition of other wood gluing means known in the art, such as carbamide, melamine or similar means.

4. Iron hydroxide is precipitated in the presence of the raw product obtained by etherifying wood with chloroacetic acid and the mixture is heated until a homogeneous mass is obtained. A particularly spreadable product is obtained.

5. To the product obtained according to Example 2 is added during the manufacture aluminium sulphate or aluminium hydroxide produced according to known methods in the presence of the sodium salt of carboxy-methyl-cellulose.

6. The raw product obtained by etherifying starch with chloro-acetic acid is treated in the same manner as in Example 1 with aluminium sulphate and slaked lime.

The ingredients of the present binder may with particular advantage be mixed in dry state, the reaction then taking place after addition of water. The individual particles should preferably be in fine subdivision and the ingredients may, separately or two or more together, be ground or brought into powder form in any other suitable way accommodated, if desired, to each particular ingredient. The pulverulent mixture can then be stored for practically any length of time without deterioration, and it can be conveniently packed in relatively cheap packings. It is also advantageous that in the commercial distribution the weight of the powder product is very low relative to the aqueous binder ready for spreading.

As a more detailed example we make a mixture of 25 kilograms of the sodium salt of carboxy-methyl-cellulose, 10 kilograms of $Al_2(SO_4)_3$ and 3 kilograms of MgO or 5 kilograms of $Ca(OH)_2$.

What we claim is:

1. Method for the manufacture of adhesives in which a water soluble compound of a metal of the group consisting of aluminium, iron, and copper is intimately mixed with a colloidal aqueous solution of an ether carboxylic acid carbohydrate of the group consisting of carboxy-alkyl-cellulose and carboxy-alkyl-starch, said alkyl being a lower alkyl group, and converting said metal compound into a substantially insoluble inorganic precipitate containing said metal.

2. Method as claimed in claim 1 in which said carboxylic acid compound is a compound of the group consisting of carboxy-methyl-cellulose and carboxy-methyl-starch.

3. Method as claimed in claim 1 in which said mixture is heated.

4. Method for the manufacture of adhesives comprising mixing intimately in dry state a water soluble salt of a metal of the groups consisting of aluminium, iron, and copper, and a water soluble metal compound capable of reacting with said metal salt in an aqueous medium to form an inorganic precipitate which is substantially insoluble in water and a high molecular polymer ether carboxylic acid carbohydrate of the group consisting of carboxy-alkyl-cellulose and carboxy-alkyl-starch, said alkyl being a lower alkyl group, and thereafter adding a quantity of water sufficient for forming an adhesive of required consistency.

5. A composition comprising a pulverulent mixture of a water soluble salt of a metal of the group consisting of aluminium, iron, and copper and a water soluble metal compound capable of reacting with said metal salt in an aqueous medium to form an inorganic precipitate which is substantially insoluble in water and a high molecular polymer ether carboxylic acid carbohydrate of the group consisting of carboxy-alkyl-cellulose and carboxy-alkyl starch, said alkyl being a lower alkyl group, and the proportion of said ether carboxylic acid compound being sufficient for preserving in colloidal state an aqueous mixture of this composition.

6. Method as claimed in claim 1 in which said metal compound is freshly formed colloidal iron hydroxide.

7. Method as claimed in claim 1 in which said alkyl group contains not more than 2 carbon atoms.

8. Method as defined in claim 4 in which the alkyl group contains not more than 2 carbon atoms.

9. Composition as defined in claim 5 in which the alkyl group contains not more than 2 carbon atoms.

10. A composition for adhesives comprising a pulverulent mixture of aluminium sulphate, a calcium compound of the group consisting of calcium carbonate and calcium hydroxide, and a water-soluble sodium salt of the group consisting of sodium carboxy-methyl-cellulose and sodium carboxy-methyl-starch.

References Cited in the file of this patent

UNITED STATES PATENTS

| | | |
|---|---|---|
| 1,682,293 | Lilienfeld | Aug. 28, 1928 |
| 2,177,269 | Sullivan | Oct. 24, 1939 |
| 2,216,845 | Larson | Oct. 8, 1940 |
| 2,495,767 | Reid | Jan. 31, 1950 |

FOREIGN PATENTS

| | | |
|---|---|---|
| 632,830 | Great Britain | Dec. 5, 1949 |